(12) United States Patent
Willems et al.

(10) Patent No.: US 9,047,565 B2
(45) Date of Patent: Jun. 2, 2015

(54) INTELLIGENT PLANT DEVELOPMENT LIBRARY ENVIRONMENT

(75) Inventors: Ivo Willems, Houston, TX (US); Michael Pye, Anderson, SC (US); Onno Paap, Spaarndam (NL)

(73) Assignee: FLUOR TECHNOLOGIES CORPORATION, Aliso Viejo, CA (US)

( * ) Notice: Subject to any disclaimer, the term of this patent is extended or adjusted under 35 U.S.C. 154(b) by 217 days.

(21) Appl. No.: 13/233,311

(22) Filed: Sep. 15, 2011

(65) Prior Publication Data

US 2012/0072386 A1    Mar. 22, 2012

Related U.S. Application Data

(60) Provisional application No. 61/383,855, filed on Sep. 17, 2010.

(51) Int. Cl.
*G06N 5/04* (2006.01)

(52) U.S. Cl.
CPC ........................................ *G06N 5/04* (2013.01)

(58) Field of Classification Search
USPC .......................................................... 706/47
See application file for complete search history.

(56) References Cited

U.S. PATENT DOCUMENTS

| | | | |
|---|---|---|---|
| 6,615,199 | B1 | 9/2003 | Bowman-Amuah |
| 6,782,305 | B2 | 8/2004 | Liteplo et al. |
| 7,693,900 | B2 | 4/2010 | Wilmering et al. |
| 7,814,429 | B2 | 10/2010 | Buffet et al. |
| 2002/0010522 | A1 * | 1/2002 | Martin ............................ 700/97 |
| 2004/0075689 | A1 | 4/2004 | Schleiss et al. |
| 2004/0117395 | A1 | 6/2004 | Gong et al. |
| 2004/0158455 | A1 | 8/2004 | Spivack et al. |

(Continued)

FOREIGN PATENT DOCUMENTS

| | | |
|---|---|---|
| EP | 1324165 | 7/2003 |
| WO | 2007101151 | 9/2007 |

OTHER PUBLICATIONS

Eiter, T. et al, "Reasoning with Rules and Ontologies", Institut fur Informationssysteme, Tehnische Universitat Wien FavoritenstaBe 9-11, A-1040 Vienna, Austria.

(Continued)

*Primary Examiner* — Michael Zidanic
(74) *Attorney, Agent, or Firm* — Fish & Tsang, LLP

(57) ABSTRACT

An intelligent plant development library environment is presented. Contemplated environments comprise an EPC knowledge system capable of incorporating know-how of one or more construction firms in the form of assembly objects. Assembly objects represent construction components (e.g., bolts, cable trays, pipes, processing units, deliverables, etc.) that can be incorporated into a plant design. Assembly objects are stored in an assembly database and include available contexts considered relevant to the assembly objects. An inference engine is utilized to derive a specified context related to a plant design from one or more design tools. The inference engine applies rule sets to infer which assembly objects to instantiate as construction objects. The inference engine can further configure the design tools to incorporate the instantiated construction objects into a plant construction project model. Example rule sets include forward chaining rules, backward chaining rules, case-based reasoning rules, inductive reasoning rules, or abductive reasoning rules.

20 Claims, 5 Drawing Sheets

(56) References Cited

U.S. PATENT DOCUMENTS

| | | | |
|---|---|---|---|
| 2005/0050537 | A1 | 3/2005 | Thomspson et al. |
| 2005/0159828 | A1 | 7/2005 | Deininger et al. |
| 2010/0241471 | A1 | 9/2010 | Nylander et al. |
| 2011/0137892 | A1 | 6/2011 | Bisson et al. |
| 2012/0072386 | A1 | 3/2012 | Willems et al. |
| 2013/0124175 | A1* | 5/2013 | McKim et al. .................... 703/6 |

OTHER PUBLICATIONS

Henze, N. et al., "Reasoning and Ontologies for Personalized E-Learning in the Semantic Web", Educational Technology & Society, vol. 7, No. 4, pp. 82-97.

Horrocks, I., "Description Logic Reasoning", The University of Manchester; Manchester, UK.

"Introduction to ISO 15926", POSC Caesar Association, FIATECH, Intelligent Data Sheet, Accelerating Deployment of ISO 15926.

Chau, K.W. et al "A Knowledge-Based System for Construction Site Level Facilities Layout", IEA/AIE 2002. LNAI 2385, pp. 393-402.

Gomez-Perez, J.M. et al, "A framework and computer system for knowledge-level acquisition, representation, and reasoning with process knowledge", International Journal of Human-Computer Studies, 2010, vol. 68, pp. 641-668.

Hilbert, F. et al., "Dynamic context-aware information access in virtual organisations", Proc. of the ICCCBE, 2010 Conference, Nottingham, UK, Jun. 30, 2010-Jul. 2, 2010.

Kaetzel, L.J. et al., "Expert/knowledge based systems for materials in the construction industry: State-of-the art report", Materials and Structures, 1995, vol. 28, pp. 160-174.

Marvie, R. et al., "Towards a Dynamic CORBA Component Platform", Laboratoire d'Informatique Fondamentale de Lille, France.

Marvie, R. et al., "Towards a Dynamic CORBA Component Platform", Objects and Applications DOA 2000 proceedings.

Patent Cooperation Treaty, "Notification of Transmittal of the International Search Report and the Written Opinion of the International Searching Authority, or the Declaration", PCT Application No. PCT/US12/55528, issued Feb. 4, 2013.

Scherer, R.J. et al., "A distributed multi-model-based Management Information System for simulation and decision-making on construction projects", Advanced Engineering Informatics, 2011, vol. 25, pp. 582-599.

\* cited by examiner

INTELLIGENT PLANT DEVELOPMENT LIBRARY ENVIRONMENT

This application claims the benefit of priority to U.S. provisional application having Ser. No. 61/383,855 filed on Sep. 17, 2010. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is engineering, design, or construction modeling and design technologies.

BACKGROUND

Large scale Engineering, Procurement, Construction (EPC) firms are required to design or model their plans before construction begins. When designing a new facility, engineers often find themselves re-engineering or redesigning components (e.g., digital objects, models, simulations, etc.) to represent physical, real-world components. The components are then used to construct a digital representation of the construction and to model operation or maintenance aspects of the construction. Re-engineering or redesigning occur because firms often lack a knowledge base storing firm wide know-how or often lack sufficient communication channels among engineers that are geographically distributed around the planet.

Others, mostly software vendors, have put forth effort to disseminate know-how in a more limited manner. Vendors prefer to lock-in customers into the vendor's proprietary environment by forcing reuse of data only from within the vendor's tools, thus limiting applicability of design objects across projects, across myriad design tools, or across a globally distributed firm. Moreover, they also fail to provide a holistic view of an assembly object, but rather merely a single tool perspective. Such an approach significantly limits reuse potential of a design object and limits collaboration with other third parties who use products from different software vendors. Such an approach can cause severe loss in efficiency or money on large capital projects where there can be literally hundreds of different third parties (e.g., design firms, construction firms, private contractors, sub-contracts, national or local government agencies, etc.) that must work together to achieve a completed construction project. A better approach would allow reuse of generic design objects via determining which contexts make the most sense for the design object.

Example efforts that have attempted to alleviate some of the above issued are described in the following patent literature.

U.S. Pat. No. 6,782,305 to Litepo et al. titled "Method of Geometric Information Sharing and Parametric Consistency Maintenance in a Collaborative Design Environment", filed Oct. 1, 2001, describes exchanging files among different software applications where the files utilize a neutral format.

U.S. Pat. No. 7,693,900 to Wilmering et al. titled "Querying of Distributed Databases Using Neutral Ontology Model for Query Front End", filed Jul. 4, 2007, discusses constructing a neutral ontology model for interfacing with multiple databases.

U.S. Pat. No. 7,814,429 to Buffet et al. titled "Computerized Collaborative Work", filed Jun. 13, 2007, describes methods of allowing multiple workers to collaborate within a design tool. The design tool can display contextual information about objects within the design. Buffet provides for workers to share a design experience inside a tool, but fails to address sharing knowledge across design tools from one project to another.

U.S. patent application publication 2005/0159828 to Deininger et al. titled "Generic Framework for Porting Legacy Process Automation Assets to a New Control System", filed Jul. 20, 2004, describes using a generic representation of objects to translate configuration information from an old system to a new system.

European patent application EP 1 325 165 to Gueli titled "Automatic System for Determining the Optimum Strategy for Controlling a Complex Industry System in Particular for Managing Water Supply Networks by Means of an Ecosystem Model", filed Dec. 18, 2002, describes operating an industrial system based on a operative context. Although useful for operating a water supply network, Gueli lacks any insight into how one can leverage a context for design objects.

Further progress is described in U.S. patent application publication 2010/0241471 to Nylander et al. titled "Integration System Supporting Dimensions Modeling System" filed Mar. 19, 2009. Nylander contemplates propagating information among workflow applications used by a design project such as a construction design project. Still, Nylander fails to appreciate that a design object can carry past experiences of previous use or a sophisticated rules mechanism.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The known art fails to provide for adequate representation of a construction firm's know-how for an assembly (e.g., physical component, module, cable tray, processing unit, pipe run, etc.). What has yet to be appreciated is a quanta of engineering know-how can be represented by an assembly object carrying information about the know-how including rules for use, contexts for use, jurisdiction information (e.g., laws, standards, policies, etc.), or other broad aspects of engineering or design know-how.

Thus, there is still a need for intelligent library environments that store engineering and design know-how.

SUMMARY OF THE INVENTION

The inventive subject matter provides apparatus, systems and methods in which engineering, construction, maintenance, operation, or management know-how can be stored and accessed via an assembly database housing assemblies representative of construction components. One aspect of the inventive subject matter includes a knowledge system including an assembly database and an inference engine. The inference engine includes an inference module capable of accessing the assembly database, where the module instantiates an assembly object based on assembly descriptions in the assembly database and based on inference rules. In more preferred embodiments, the inference module can correlate a specified context into which the assembly is to be placed and those contexts considered available for the assembly. Once instantiated the assembly object can be presented to an external tool, possibly a design or engineering tool. The inference module can employ various types of rules to determine if an assembly object could be placed within a project design. Example rules include forward chaining rules, backward chaining rules, case-based-reasoning rules, or other types of rules representing different reasoning styles. Furthermore, the rules can carry jurisdiction information, compliance information, or other types of rules that can impact how an assembly fits within a project design.

Yet another aspect of the inventive subject matter can include methods of optimizing plant construction contexts, where a context can be considered a programmatic description of possible uses of assemblies. Contemplated methods can include providing an assembly database storing one or more assembly objects where the assembly objects can comprise more than one possible context in which the assembly would be suitably placed. An inference engine can also be provided having rules governing how the assembly can be instantiated based on a specified context. The specified context can be provided by an engineer or designer, or the context can be derived from a design project, possibly based on input from multiple, propriety design tools. The method can further include instantiating an assembly object according to the specified context and based on one or more design rules. Once the assembly object is incorporated into a design, one or more global context metrics can be measured or otherwise derived to determine if an improvement of the metrics has been achieved. Based on the global context metrics one or more alternative assemblies can be recommended by the system to move the assemblies toward a more optimized configuration.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
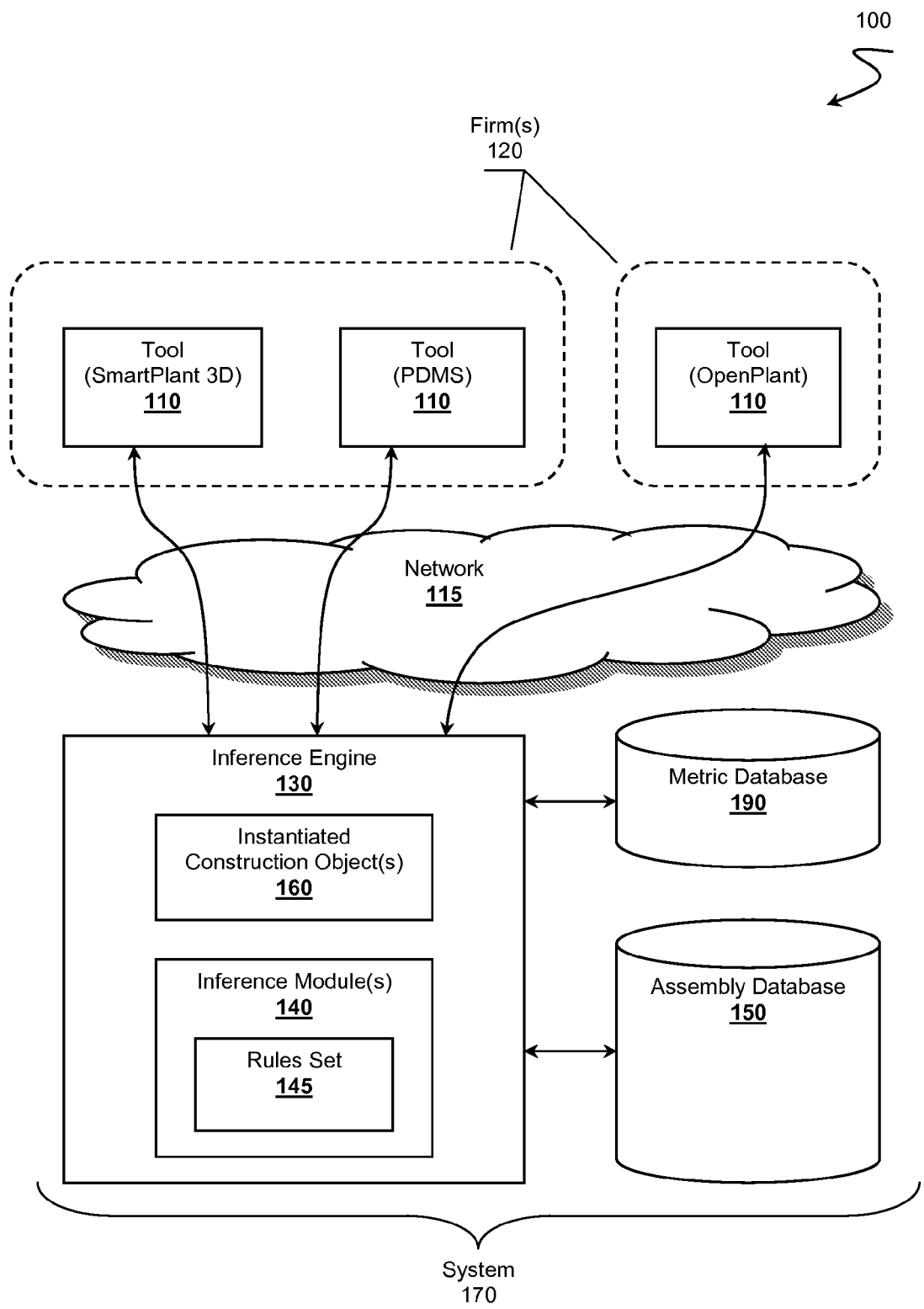
FIG. 1 is a schematic overview of an intelligent plant development library environment.

It should be noted that while the following description is drawn to a computer/server based plant construction knowledge system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including configuring engineering tools, design tools, or other external tools. As the system identifies relevant assemblies, the system instantiates the assembly objects as construction objects and configures one or more external tools to incorporate the construction object into a construction project model. Each of the external tools could comprise their own distinct, respective construction project model for the same construction project.

The following discussion provides many example embodiments of the inventive subject matter. Although each embodiment represents a single combination of inventive elements, the inventive subject matter is considered to include all possible combinations of the disclosed inventive elements. For example, if one embodiment comprises inventive elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Ideally, an EPC firm should manage their know-how in a more efficient manner rather than distributing information in hard copy, or worse through word of mouth. One approach for disseminating know-how can include constructing a computer-based library environment for engineers or designers where know-how is stored as complex assembly objects. Assembly objects can include information beyond a mere digital representation of a physical construction object, and can include complex structures comprising contexts for which the assembly object is appropriate, rules governing the design of the assembly object, past use information based on previous experiences, jurisdiction constraints, or other information. Assembly objects can be stored in a generic parameterized format to facilitate incorporating the assembly objects into different design tools throughout the firm or other firms.

Each of the assembly objects can be semantically linked to one or more ontologies, possibly according a normalized abstraction or taxonomy. Providing an ontology of assembly objects increases an efficiency of searching for or otherwise accessing assembly objects through various styles of reasoning. Styles of reasoning can be embodied by rules sets, which guide an inference engine to find suitable assembly objects representing a possible solution for a specified context in a plant construction project. It is contemplated that a library of assemblies can have thousands, millions, or even more assembly objects, necessitating an organized retrieval system. Example discussions relating to reasoning based on ontologies include "Description Logic Reasoning", a presentation by Ian Horrocks of The University of Manchester, Jul. 18-22, 2005, at the 13$^{th}$ International Conference on Conceptual Structures, Kassel, Germany; "Reasoning and Ontologies for Personalized E-Learning in the Semantic Web", by Nicola Henze et al. in Educational Technology & Society, 7 (4), 82-97, 2004; and "Reasoning with Rules and Ontologies", by Thomas Eiter et al. in *In Reasoning Web* 2006, 93-127. Interestingly, it has yet to be appreciated that ontological reasoning can be applied to the design of large scale plant construction projects.

In FIG. 1, intelligent plant development library environment 100 comprises plant construction knowledge system 170, which represents a knowledge store housing know-how across one or more of firms 120. Knowledge system 170 comprises inference engine 130, assembly database 150, or possibly metric database 190.

Firms 120 utilize design tools 110 to design a plant for construction, where tools 110 can be considered external to the knowledge system. Tools 110 can range from simple spreadsheet applications to complex three-dimensional plant construction design tools from many disparate vendors. Numerous existing external design tools 110 can be leveraged for use with the inventive subject matter. Example tools 110 that could be adapted to benefit from accessing an intelligent library environment 100 include SP3D™ (SmartPlant 3D) by Intergraph™, PDMS™ from Aveva™, and OpenPlant™ offered by Bentley™. It is also contemplated that vendors offering A.I. tools could also be adapted for use. For example, Everest™, ILOG™, or DNV™ have inference engine technologies that could be configured for use with respect to inference engine 130.

One should appreciate tools 110 can originate from distinct tool vendors where each vendor's tools utilize different or distinct internal technologies. For example, each of tools 110 might utilize a different proprietary format for storing construction objects or incorporating construction objects into a construction project model. In such a scenario, inference engine 130 can provide an integration layer capable of converting system objects (e.g., assembly objects, context objects, instantiated construction objects, etc.) from one format to another. In some embodiments, objects are stored or exchanged via XML. In more preferred embodiments, objects are stored or exchanged according to a format based on ISO 15926.

Knowledge system 170 can also include metric database 190, which stores one or more historical metrics associated with various contexts. The metrics preferably comprise global project metrics representing a measure of the project's or construction project model's overall performance, efficiency, or other property. Example metrics can include cost, time to complete, inspection efficiency, logistic efficiency, number of personnel, flow rates, throughputs, or other metric considered relevant for a plant construction project.

Inference engine 130 can interface with tools 110 over network 115, preferably according to each of tool's 110 preferred communication protocols. Interference engine 130 can obtain construction project model information from one or more of tools 110, which can be leveraged to determine one or more contexts associated with the construction project model. For example, inference engine 130 might learn that a specific plant is to be constructed in northern Canada, which could indicate the plant has an environment context associated with cold weather. Inference engine 130 can derive a context based on attributes obtained from each of tools 110, derived based on user input via external tools 110, a desired initial condition definition, a desired final condition definition, a boundary condition comprising defined initial and final conditions, or other factors.

Inference engine 130 preferably comprises a modifiable inference module 140 having one or more of rule sets 145 governing determination which assembly objects from assembly database 150 are to be instantiated as instantiated construction objects 160. Inference engine 130 instantiates construction objects 160 according to rules set 145, a specified context possibly derived from information obtained from tools 120, available contexts, or behaviors associated with the assembly objects in assembly database 150.

Figure 2:
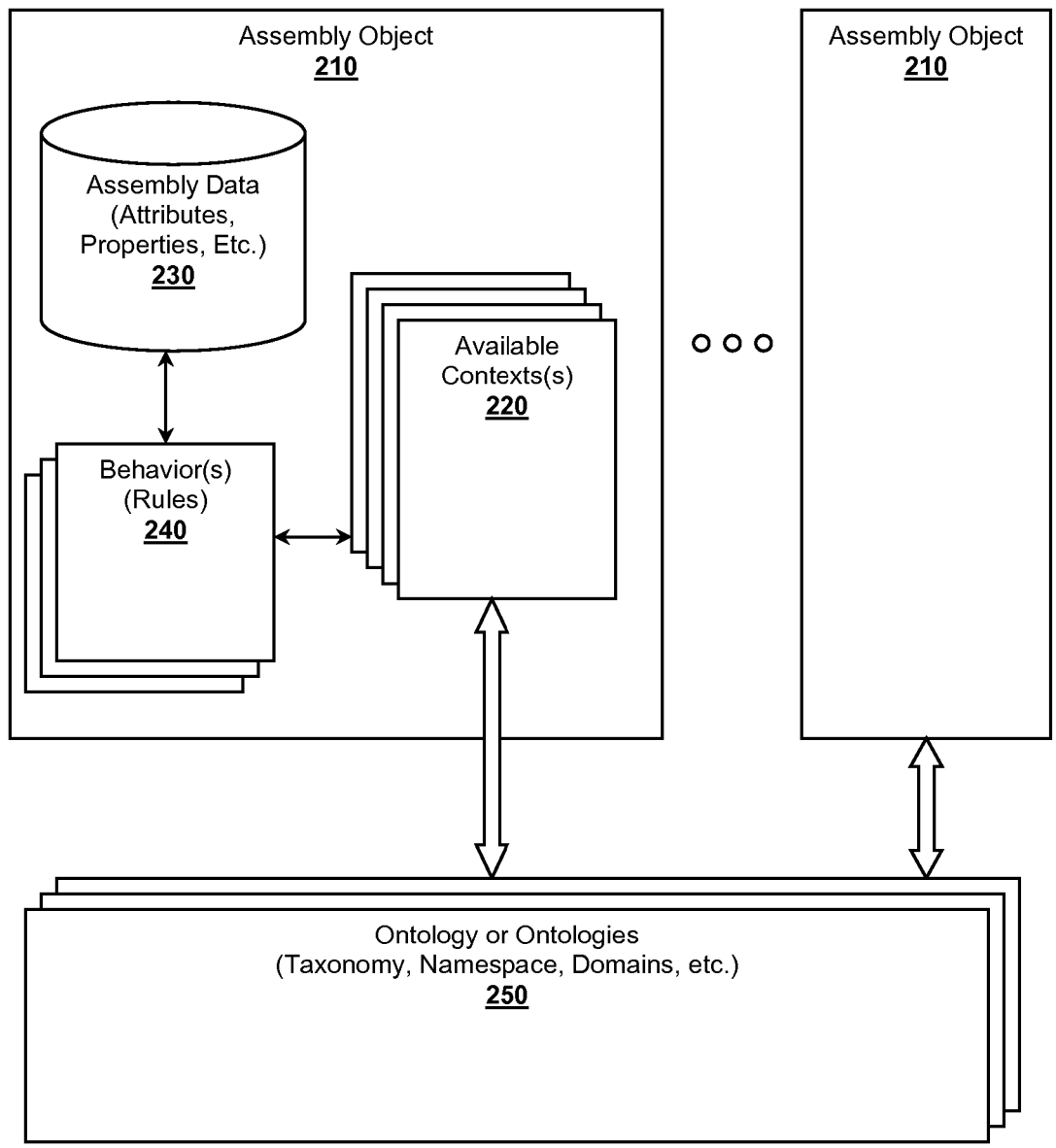
FIG. 2 illustrates an assembly object.

FIG. 2 presents an overview of assembly objects 210 stored in an assembly database. Assembly object 210 can comprise one or more available contexts 220, assembly data 230, or one or more assembly behaviors 240.

An assembly object 210 can be considered a digital representation of previously used know-how reflecting a solution to previous design issues in historical construction projects. Assembly object 210 can comprise information describing a construction component, or collection of components, considered useful for one or more available contexts 220. Construction components can vary widely and can include a processing unit, a room, a pipe run, a cable tray, a module, a fixture, a beam, a bolt, a person, or other types of construction related components. In some embodiments, assembly object 210 can comprise multiple sub-assemblies where assembly data 230 can include links to other assembly objects 210, or can combine to form a single assembly object 210. For example, an instantiated construction object could comprise a cable run, which could include multiple sub-objects: trays, surface mounts, bolts, inspection points, or other items linked to the cable run object.

Each assembly object 210, as discussed above, also has one or more available contexts 220. Available contexts 220 indicate circumstances or conditions where assembly object 210 is considered to be relevant. An inference engine compares available contexts 220 against specified contexts within an ontology relating to a construction project model to determine if assembly object 210 could be a likely candidate for incorporation into a construction project model.

Assembly data 230 represent data about the nature of assembly object 210, which can include parameters associated with a corresponding construction component. The parameters can be context dependent and can have NULL values, but can be fleshed out upon instantiation as a construction object. For example, assembly object 230 could represent a length of pipe having NULL parameters associated with a length, a diameter, flow capacity, and two end point coordinates. Upon instantiation based on a specified context, the parameters can take on specific values to fit a current project and context. One should also appreciate that assembly object 210 can comprise an assembly of other assembly objects 210, possibly organized hierarchically or linked to each other. When a target assembly object 210 is selected, its sub-assembly objects are also selected via the hierarchy or links. Further, upon instantiation the instantiated construction object can comprise an assembly of instantiated construction objects from the sub-assembly objects. Thus, a single construction object can comprise nested or linked objects.

Behaviors 240 comprise a collection of rules governing use of assembly object 210. For example, an assembly object 210 representing a processing unit might have a different operating parameters (e.g., temperature, pressure, in-flow, out-flow, etc.) depending on its target contexts. In one context, behaviors 240 might dictate a first set of parameter values governing behavior of the processing unit, while a different context might dictate a completely different set of parameters values governing behavior of the processing unit. In some embodiments, a behavior 240 can be bound to one of available contexts 210, while in other embodiments a behavior 240 can be bound to multiple available contexts 210. When an assembly object 210 is instantiated as a construction object, the parameters of the construction object can be derived from behaviors 240, the specified context, or the inference rules used to identify corresponding assembly object 210. The inference engine can further select which behavior rules are most relevant as a function of the available context 220 or the specified contexts.

Available context 220 represents metadata indicating how, what, when, where, or other factors impacting how an assembly object 210 might be used. For example, a pumping station might have an available context relating to a location, a desert or frozen tundra for example. Available context 220 can come in different types according to project attributes or characteristics. Example types include those associated with a facility, a geo-location, weather, facility owner, safety, or other attributes related to the construction project where the attributes preferably adhere to ontology 250.

In a preferred embodiment, assembly objects 210, or other objects within the system (e.g., instantiated construction objects, contexts, tools, etc.), are associated with one or more of ontology 250 representing a formal definition of a construction project domain. Ontology 250 can comprises a taxonomy having a formalized namespace or relationships. Assembly objects 210 or available contexts 220 can be tagged with names from the namespace within the ontology. Further, ontology 250 can also include relationship information among domain concepts allowing an inference engine to determine how construction objects relate to each other according to contexts. Available contexts 220 preferably include ontological metadata describing how corresponding assembly object 210 fits within one or more contexts, a priori known contexts for example. Ontology 250 can be constructed according to a global view of a project. In some embodiments ontology 250 is project agnostic allowing the same ontology (e.g., taxonomy, namespace, relationships, etc.) to be applied across multiple projects. Such an approach is considered advantageous because assembly objects 210 can be leveraged from one project to another. Further, more than one of ontology 250 can be employed for a single project. One should appreciate ontology 250 can comprises an assembly taxonomy that aids in forming an ontology for assembly objects 210 from a global perspective. The taxonomy or ontology 250 can be considered a normalized view of knowledge system objects without constraints imposed by individual design tools. Example ontologies that could be adapted for use with the inventive subject matter include Suggested Upper Merge Ontology (SUMO; URL www.ontologyportal.org), Upper Mapping and Binding Exchange Layer (UMBEL), ontologies supported by OpenCyc (www.opencyc.org), or other ontologies.

Ontology 250 represents single unified view of assembly objects 210 across elements within the intelligent library environment and can be generated to ensure assembly objects 210 maintain coherency among each other and across a design tool ecosystem. In some embodiments, a governing body can review, ratify, codify or otherwise recommend assembly objects 210 for incorporation into a library for further use. The governing body can also make recommendations to modify ontology 250. Still, further, an inference engine can offer recommendations on modifications to ontology 250 based how often the engine reviews ontological relationships. For example, if a set of relationships are analyzed frequently, the inference engine can recommend that the set of relationships be collapsed into single instance, or that a chain of relationships be collapsed in a single direct relationship between classes, domains, or objects.

Figure 3:
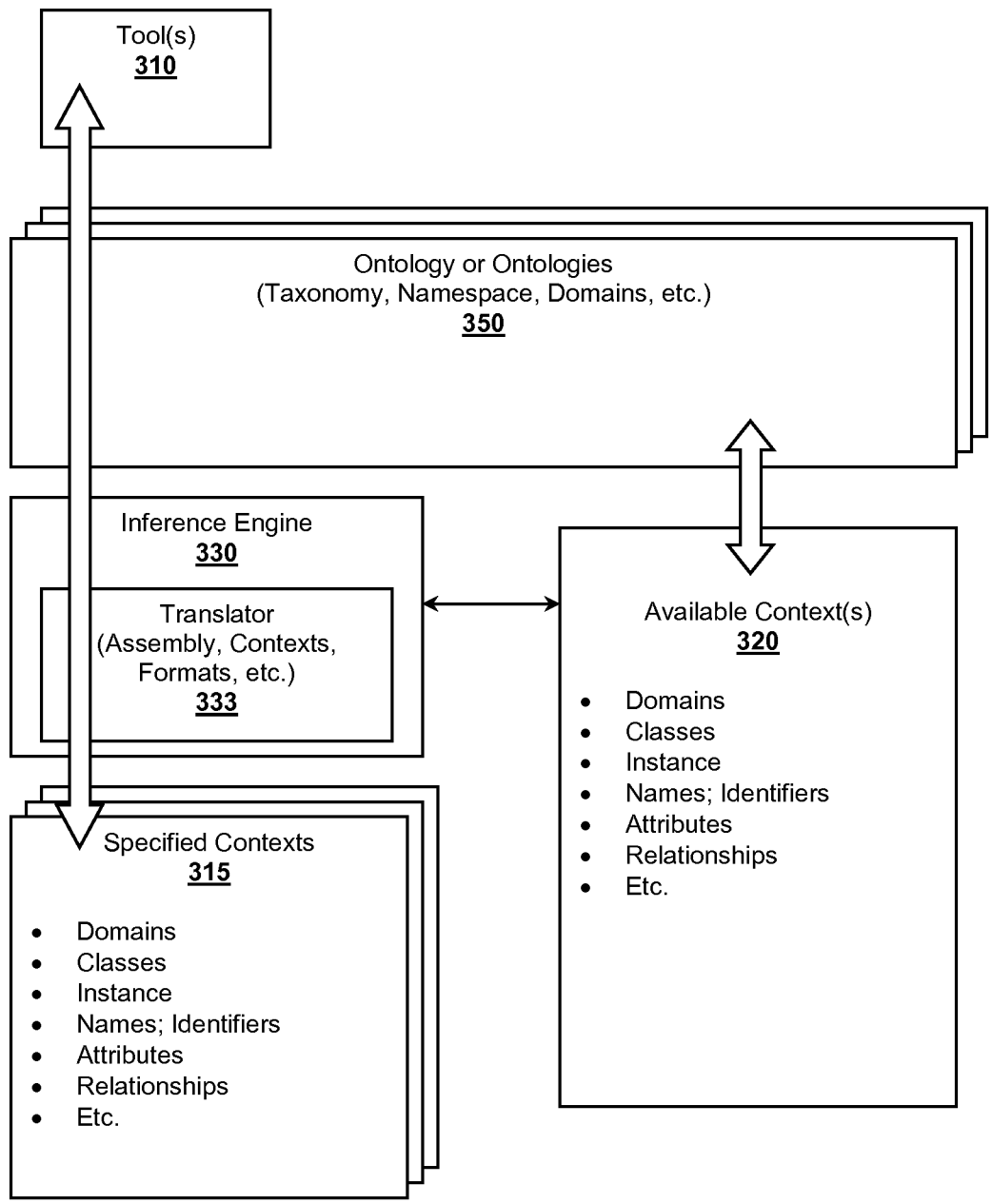
FIG. 3 illustrates an overview of contexts derived from an ontology.

In FIG. 3, inference engine 330 interacts with one or more of design tool 310 to derive specified context 310 as determined based on ontology 350. Inference engine 330 can obtain construction project model information from tools 310 and convert the model information into an ontologically aligned data format. For example, inference engine 330 can include assembly translator 333 for each tool where the translator module comprises conversion rules from the tool's proprietary schema to that of ontology 350. Inference engine 330 uses the converted model information to generate one or more specified contexts 315 that represent an actual use case within the construction project model. Specified contexts 315 can change throughout a design or might only be applicable during specific phases of project: a design phase, an engineering phase, an operational phase, an end-of-life phase, or other construction phases.

Specified context 315 represents a context object defined in terms of a specified ontology 350 and can take on many different forms. In some embodiments, specified context 315 has a minimal definition and only pertains to a single design element within a single external tool 310. For example, a modeled cable tray might require a wall fastener. Inference engine 330 might determine the context is localized to a single room and a single cable tray as depicted in a CAD tool. However, in other embodiments, specified context 315 can bridge across multiple tools. For example, one tool 315 could include SmartPlant 3D while a second tool could include Microsoft® Project® having a Gantt chart for plant inspections. Inference engine 330 can utilize information from both tools to determine that specified context 315 relates to inspection points across a plants life cycle. Still, in other embodiments, specified context 315 can also include a user specified context. Inference engine 330 can operate on multiple contexts as the same time across a spectrum of context types or complexities.

Specified context 315 can be defined into terms of data members adhering to one or more of ontology 350. Example data members can include information relating domains, classes, instances, relationships, or other ontological information. Specified context 315 can also comprise a name or identifier that uniquely identifies specific context 315 so that it can be managed separately from other context objects. In a similar vein, available contexts 320 within assembly objects can also be defined in terms of data members adhering to ontology 350.

Specified context 315 can also carry additional information beyond ontological information. For example, specified context 315 can also include information, possibly in the form of metadata, indicating preferred rules sets that should be applied when attempting to identify relevant assembly objects. The rules sets can be explicitly identified by reference identifier or name (e.g., forward changing, case based reasoning, backward chaining, etc.). Inference engine 330 can access an inference module having the proper rules set based on the identifier, name, or other rules set reference.

Inference engine 330 can also derive specified context 315 based on user input or rules sets used by the engine when analyzing a construction project model. For example, a user or rules set might define an initial condition (e.g., requirements, criteria, rules, behaviors, etc.) from which interference engine 330 should begin an analysis. In such an approach, inference engine 315 would likely employ a forward changing reasoning rules set, and start the analysis at the initial condition. Inference engine 330 applies one or more reasoning styles to identify existing know-how (i.e., assembly objects) that pertain to the current project. If an initial condition is specified, the specified context 315 can be derived from the initial conditions. In more preferred embodiments, the initial condition is defined in terms of a desired ontology 350.

In other examples, inference engine 330 can derive specified context 315 from a desired end condition (e.g., requirements, criteria, rules, behaviors, etc.) for a specific portion of a construction project model. Perhaps specified context 315 indicates that construction project model must result in a cable tray run having a very specific configuration. Based on the existence of the identified end condition definition, inference engine 330 utilize a backward chaining rules set as a reasoning style. Inference engine 330 could analyze the construction project model's defined end condition to indicate, which assembly objects 210 could give rise to the defined final condition.

One should appreciate that such approaches are capable of spanning across phases of a project. For example, a defined final condition could include a desired set of inspection points or procedures during plant operations. Inference engine 330 can backward chain through known assembly objects to create a chain, or a set, of bound instantiated construction objects 360 applied during a design phase that would allow for the inspection points or procedures to be present in the final plant construction model.

As indicated above, inference engine 330 attempts to determine which assembly objects would likely be relevant to specified context 315 by applying reasoning according to one or more rules sets. The rules sets dictate the operation of inference engine 330 with respect to reviewing available contexts 320 according the relationships established within ontology 350. In embodiments having more than one of ontology 350, inference engine 330 can derive specified context 315 from a specified ontology 350. For example, a design engineer could be working on an early stage design review and could instruct inference engine 330 to use a design-phase specific ontology, possibly defined in terms of a jurisdiction. Once the specified ontology is selected or otherwise chosen, inference engine 330 derives specified context 315 through converting design tool information from the tool's proprietary format into a context based on the selected ontology 350. Specified context 315 can carry information related to the ontology's domains, classes, instances, attributes, relationships, or other ontological information.

One should further appreciate that for a single ontology 350, more than one specified context 315 might apply to a current plant construction model. Inference engine 330 can select one or more of specified context 315, possibly under direction of a user, as a starting point for its analysis. Further, inference engine 330 can automatically select a specific context 315 based on matching criteria of a plant's model to the specified contexts 315. When inference engine 330 has one or more specified contexts 315, it can begin analyzing the plant construction model according to one or more reasoning styles to determine which assembly objects might have merit for incorporation into the model.

Figure 4:
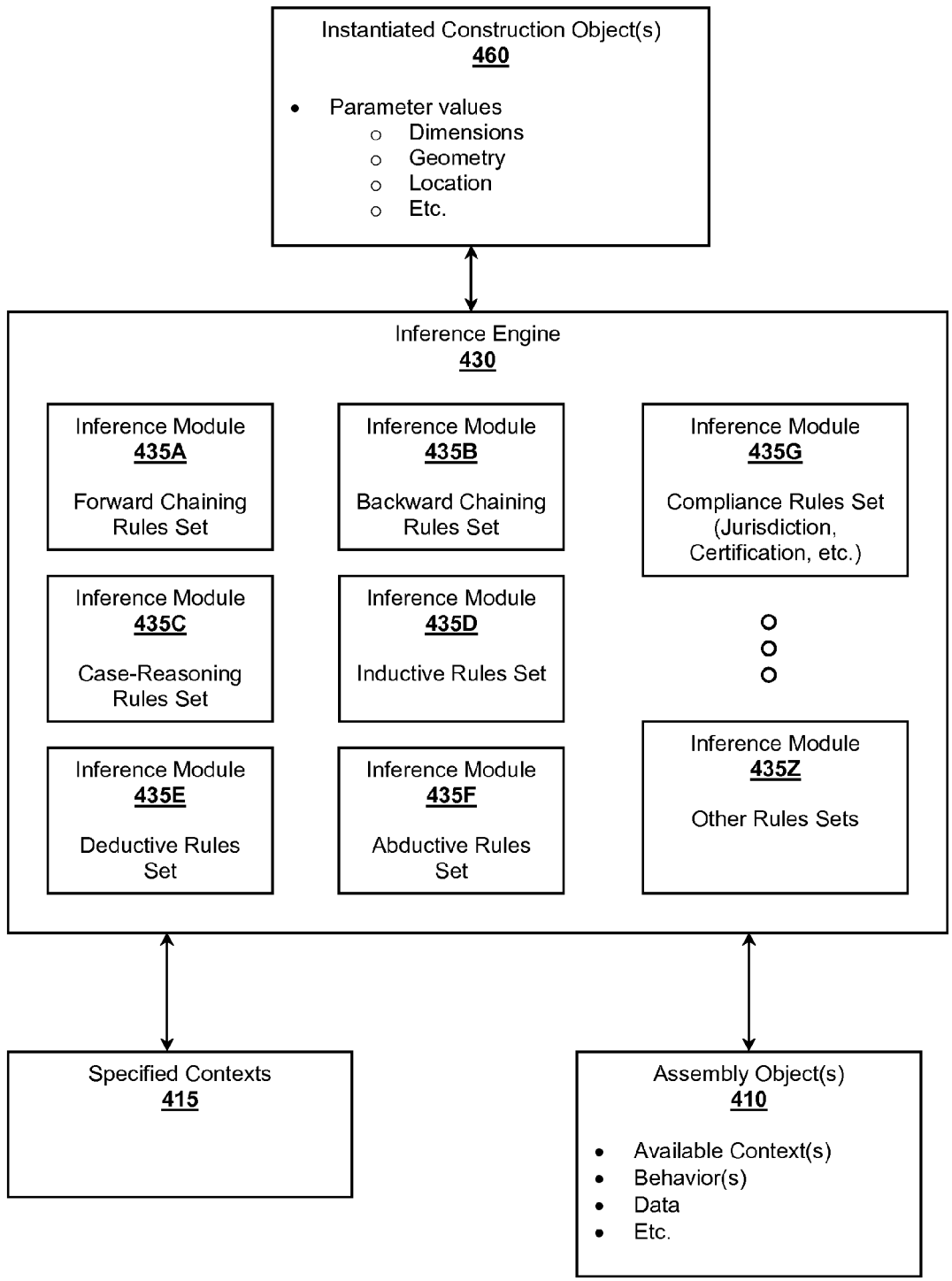
FIG. 4 illustrates an inference engine employing a rule set to instantiate a construction object.

In FIG. 4, inference engine 430 has access to many inference modules 435 (e.g., modules 435A through 453Z), each inference module comprising a different rules set targeting a different style of reasoning. Inference modules 435 represent modifiable modules capable of being replaced, updated, changed, managed, or otherwise altered. Providing access to multiple inference modules 435 is considered advantageous because different reasoning styles can yield different results, which can give rise to unexpected optimizations as discussed below. Furthermore, modifiable inference modules 435 also allow for customizing reasoning behavior for a specific project. For example, a project in one jurisdiction (e.g., The United States) might require one type of reasoning to converge on a project plan within jurisdictional requirements while in a another different jurisdiction (e.g., China) a different type of reasoning might be required to converge on a project plan.

Inference engine 430 applies the rules sets from inference modules 435 to determine if assembly object 410 has relevance to specified context 415. If relevance is established based on the available contexts of assembly object 410, inference engine 430 instantiates assembly object 410 as instantiated construction object 460. One should appreciate that assembly object 410 can comprise one or more relevant available contexts that might or might not apply to specified context 415. Inference engine 430 selects the relevant available contexts based on the employed rules sets. Then, inference engine 430 instantiates assembly object 410 as instantiated construction project 460 by fleshing out the parameter values of the object. The parameter values can be derived from the attributes of specified context 415, direct interaction with a design tool, attributes of the corresponding available context in assembly object 410, behaviors of assembly object 410, or from the rules sets. Example parameter values can include physical dimensions of components, geometry, location or coordinates, names of personnel, resource assignments, catalog numbers, or other values.

The behaviors of an assembly object can dictate the functionality of instantiated construction object 460. When more than one behavior rules sets are available or correspond to the assembly object's available contexts, inference engine 430 can be configured to select the behavior rules as a function of the available context or the current specified ontology. For example, an ontology associated with foundation construction and an available context relating to construction in an artic environment could result in inference engine selecting behavior rules for a concrete foundation constructed in permafrost learned from previous experiences.

Instantiated construction object 460 can be instantiated as a tool agnostic object or as a construction object targeting a specific tool. In some situations is it advantageous to instantiate construction object 460 according to a neutral tool agnostic format (e.g., XML, ISO 15926, etc.). When desired or necessary, construction object 460, or portions of construction object 460, can be converted to a target tool's proprietary format. Such an approach allows for incorporating construction object 460 into multiple, possibly disparate, tools. For example, specified context 415 could relate to an inspection site (e.g., a room, a pipe run, a weld, etc.) within a plant. In response to specified context 415, inference engine can instantiated an inspector object having information related to specific individuals that could conduct inspections as the inspection sites. The inspector object, now instantiated construction object 460, carries specific information applicable to one or more tools. For example, a CAD tool would likely require physical dimensions about the inspector (e.g., a conical man) while a project management tool would likely require an actual name, certifications, location, or other information about the inspector. In either case, instantiated construction object 460, or information housed within construction object 460, can be converted to a proper format for use with the corresponding tool. Alternatively, instantiated construction object 460 could have multiple instances where each instance targets a specific tool. With respect to the inspector example, a first inspector instance might include a conical man for the CAD tool while a second inspector instance might include a data structure for insertion into project management software. Specified context 415, available contexts, behavior rules, specified ontologies, or other sources can include requirement information relating to the instantiation requirements governing how to instantiate construction object 460 (e.g., names, attributes, parameters, values, properties, etc.).

Inference engine 430 can utilize one or more rules sets to select a target assembly object 410 for instantiation as illustrated by inference modules 435. Each of inference modules 435 comprises a different rules set representing different styles of reasoning. Inference engine 430 can be configured to utilize one rules set over another as desired. In some embodiments, a user can instruct inference engine 430 which rules set to use. In other embodiments, inference engine 430 can automatically select a rules set based on information within specified context 415, or based on a specified ontology. As mentioned previously, if a user defines an initial condition reflecting a desired construction project model, inference engine 430 could recognize the initial condition as a start point. Inference engine 430 can then select inference module 435A having a forward chaining rules set that can be applied to the start point. Inference engine 430 can begin analyzing the construction project model from the initial specified context 415 to determine which assembly objects 410 can incorporated into the construction project model within the bounds of the specified ontology. Inference engine 430 extrapolates the construction model forward searching for assembly objects 410 that fit according to specified context 415. When an appropriate assembly object 410 is found, the inference engine 430 might stop its forward chaining process at that point to allow user interaction, or might continue forward, possibly updating specified context 415 to reflect the incorporation of instantiated construction object 460, until a halt condition is reached (e.g., optimized metric, number of iterations, time spent in analysis, etc.).

Other reasoning styles are contemplated beyond the style offered from forward chaining rules sets. Inference module 453B offers a backward chaining rules set, for example. Inference engine 430 can apply a backward chaining rules set when an end condition definition is encountered where specified context 415 is derived from the end condition definition. The end condition could be in the form of a desired metric outcome, a plant configuration, a cost, or simply a specified person assigned to a task. Inference engine attempts to evaluate assembly objects 410 by working backwards from the defined end condition to determine what initial construction objects 460 would be necessary to give rise to the end condition. One should appreciate that more than on set of construction objects 460, or chain of construction objects 460 bound to each other, could give rise to the same end condition. Each chain could be evaluated based on criteria comprising context metrics to determine which of instantiated objects 460 or chain of bound objects should be recommended. The recommendations can be presented according rankings based on the metrics.

One should appreciate that the various chaining processes or reasoning styles provides for binding one or more instantiated construction objects 460 together as a possible solution for specified context 415. In some embodiments, a first construction object 460 would likely be applicable to specified context 415. Subsequently instantiated construction objects 460 might not be directly applicable to specified context 415, but rather might be more applicable to a context related to previously instantiated construction objects 460. Such a condition can occur because each instantiated object bound together in the plant construction model can alter a current definition of specified context 415. The chain does not necessarily have to comprise a linear chain of bound construction objects 460, but rather can include series of links among the objects (e.g., hierarchy, linked list, etc).

Inference module 435C includes a case-based reasoning rules set. When an initial condition definition and an end condition definition are presented, inference engine 335 can employ the case-based reasoning to explore possible middle ground between the two end points boundary conditions. Inference engine 430 can consult the assembly database for assembly objects 410 representing previously employed solutions to similar problems as represented by the initial and end condition definitions. Inference engine 430 can apply the case-based reasoning rules to retrieve known solutions to similar problems, attempt to map known solutions to the current conditions, instantiate construction objects 460 according to the conditions of specified context 415, or archive a successful solution in the form of modified or new assembly objects 410.

Inference modules 435D, 435E, and 435F comprise inductive, deductive, and abductive rules sets, respectively. These rules sets represent logical reasoning styles capable of generating a possible solution for a given specified context 415. The deductive rules set of inference module 435E results in a logically valid result if the conclusions (i.e., instantiated construction 460) following necessarily from the initial premises (i.e., requirements or conditions in specified context 415) based on the specified ontology. Although the deductive rules set results in a logically valid result, the result might not be optimal. Abductive and inductive rules sets offer inference engine 430 the ability to discover possible solutions addressing the concerns defined in specified context 415 that might not be considered otherwise. Use of abductive or inductive rules sets allow for making qualitative leaps from one concept to another that might not have logically valid relationships, but could be a valid solution to a problem. For example, such reasoning might conclude that cable tray routing can follow similar rules as networking packet routing rules. Assembly objects 410 for both types of routing have the attribute "routing", but might be assigned to different domains within the ontology and would be ignored by other types of reasoning.

Inference module 435G comprises a compliance rules set designed to identify solutions to the issues of specified context 415 that would comply with the rules, requirements, regulations, or other restrictions imposed on a plant construction project. For example, one jurisdiction (e.g., a city, a county, a province, a state, a country, a region, etc.) would likely have different restrictions than another jurisdiction. The compliance rules set can embody the restrictions for the jurisdiction or other governing body (e.g., government, firm, standards body, union, organization, etc.).

Although a number of different types of reasoning styles are presented, it should be appreciated that inference modules 435 can be modified according to a specific project or circumstance. For example, inference module 435G can be modified for a specific jurisdiction where a plant is to be constructed while also being combined with inference module 435C. Further, other types of reasoning styles can also be employed as represented by inference module 435Z beyond those shown. Other types of rules sets can employ reasoning styles including analogical reasoning, defensible reasoning, probabilistic reasoning, statistical reasoning, retroductive reasoning, or other styles of reasoning that can be applied within a specified ontology.

Inference engine 430 can be configured to halt or stop its reasoning according to various schemes. For example, the reasoning can be halted based on number of iterations, relative distance between specified context 415 and available contexts 410 based on the ontology definition, time spent reasoning, convergence on one or more context metrics, or other factors. Relative distance between contexts can be quantified as a function of ontological features. For example, the number of "hops" from an ontological concept (e.g., domain, class, etc.) in specified context 415 to a concept in available contexts in assembly objects 410. The distance can be considered a range of exploration. If assembly objects 410 have available contexts outside the range, they are not evaluated, thus limiting the scope of evaluation. The distance could also be measured based on weighted strength of relationships between concepts. Context metrics can be evaluated as instantiated construction objects 460 are created or incorporated into a design module. Context metrics can include cost, time, resources, personnel, congestion, rate of return, inspection points, or other types of metrics. The metrics could be evaluated based on a simulation of the construction project model for example.

Figure 5:
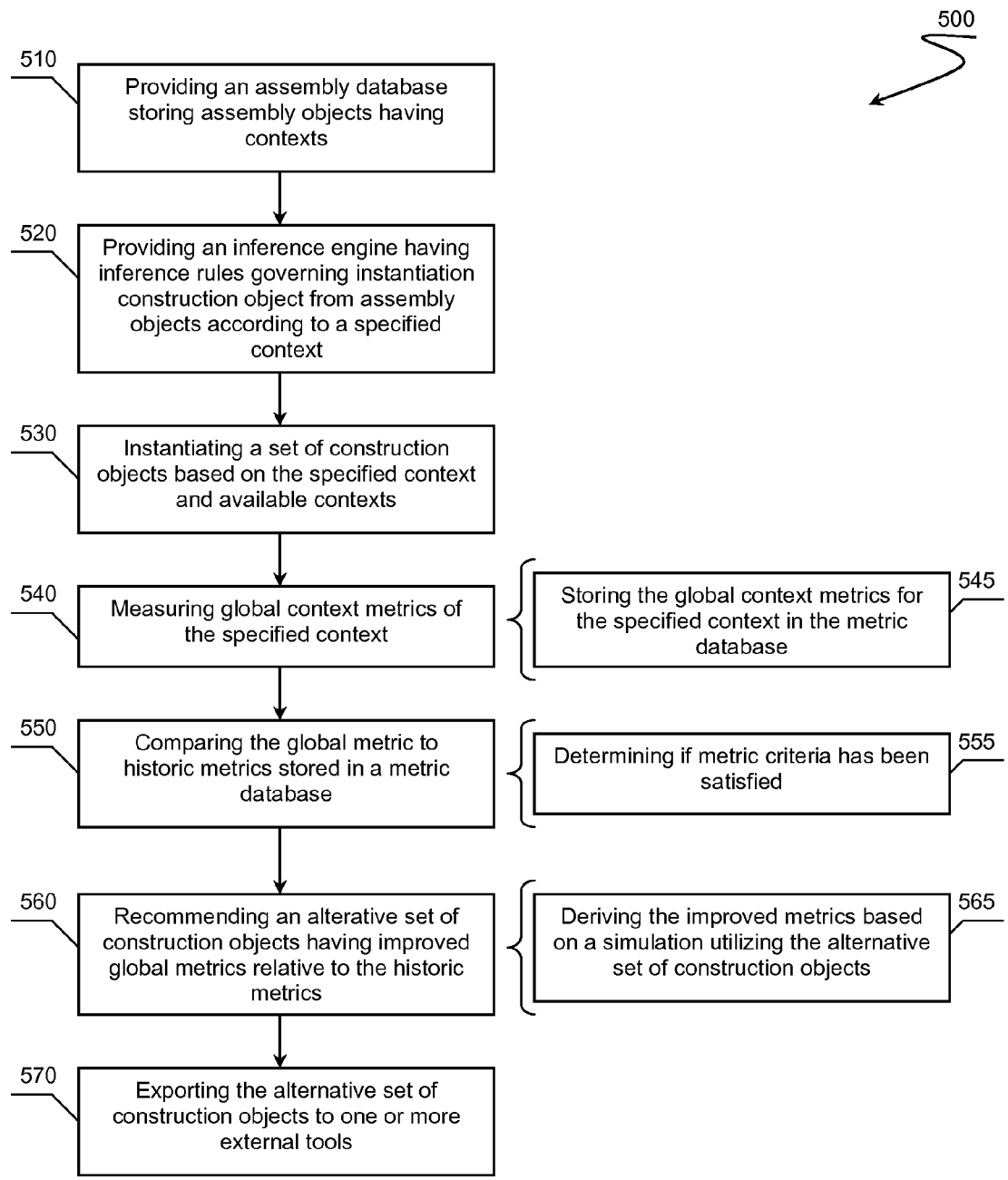
FIG. 5 illustrates a method of optimizing plant construction contexts.

As discussed above, an inference engine can reason through which assembly objects representing a firm's know-how best fit a specified context according to one or more metrics. The inference engine can also configure design tools to incorporate instantiated construction objects that optimize a construction context. In FIG. 5, method 500 represents a possible method of optimizing plant construction contexts using the techniques discussed previously.

Step 510 includes providing an assembly database storing one or more assembly objects. The assembly objects represent complex objects rather than merely a record of physical component geometry. An assembly object can include an amalgam of information from many different engineering or design perspectives embodying a firm's know-how. In some embodiments, the knowledge system can roam multiple tools to acquire assembly information for incorporation into the assembly object database, or automatically provision assembly object information. An assembly object, along with other types of objects in the knowledge system, can be stored according to a neutral tool-agnostic format (e.g., XML, ISO 15926, etc.). Assembly objects also comprise one or more available contexts representing circumstance where the assembly object has been found to makes sense. As discussed previously, the available contexts or other objects in the system can be defined in terms of an ontology by having attributes associated with domains, classes, instances, relationships, or other ontological information.

Step 520 includes providing an inference engine having inference rules governing instantiation of construction objects from the assembly objects according to one or more specified contexts. The specified contexts can also be defined in terms ontological information. Interference engine can employ its rules to determine which assembly objects would or could fit the specified context based on the available contexts of the assembly objects.

Step 530 includes instantiating a set of one or more construction objects according to the specified context and based on the inference rules or available contexts of the corresponding assembly objects. Instantiating a construction object includes creating a distinct, manageable object within the design tool ecosystem having fleshed out parameters applicable to the specified context. The construction object's parameters (e.g., dimensions, locations, names, identifiers, properties, etc.) can be derived from the attributes of the corresponding assembly objects, the specified context, behavior rules, or the inference rules. The instantiated construction objects can be incorporated directly into a design tool according to the design tool's proprietary format or can be retained within the ecosystem in a neutral tool-agnostic format. As necessary or desired, the construction object's information or features can be converted into a tool-specific construction object, which can be incorporated directly into a construction project model of an external target tool.

Step 540 includes measuring one or more context metrics associated with the specified context. Once the construction objects are instantiated or incorporated into the design, the metrics can be measured as a function of construction project model features (e.g., parameters, attributes, simulations, etc.) or construction objects parameters. The metrics can reflect costs, time, personal, throughput, efficiency, flow rates, or other measurable values. In some embodiments, the metrics are estimated based on running a life-cycle simulation of the construction project model that incorporates the set of instantiated construction objects. The context metrics can include local metrics to a context or global metrics associated with the entire plant construction project. Step 545 further contemplates storing the context metrics into a metrics database as a historical metric for future comparison. Evaluated metrics can be tagged with context information (e.g., name, identifier, ontological information, time stamps, model identifiers, tool identifiers, etc.) allowing the system to compare historical metrics with newly calculated metrics with respect to similar contexts.

Step 550 includes comparing the measured metrics to historical metrics stored in the metric database. The system can determine if the set of instantiated construction objects offer a better solution for the specified context than other possible solutions. For example, subtle variations in a set of instantiated construction objects could yield drastically different metrics indicating opportunities for optimization. Step 555 includes determining if the comparison of the metrics results in satisfaction of metric criteria. If so, the system can be triggered to stop evaluation or seek additional alternative solutions depending on the criteria requirements. The metric criteria can include absolute criterion where the metric itself does or does not meet the criterion, or relative criterion where the metric satisfies the relative criteria relative to historical metrics.

Step 560 includes recommending an alternative set of instantiated construction objects resulting in an improved context metric relative to the historical metrics. The alternative set of instantiated construction objects can result from application of different reasoning styles reflected in the inference engines rules set. For example, a forward chaining rules set can result in first set of instantiated construction objects while a case-based reasoning rules set can result in a second different set of instantiated construction objects. Both sets could represent valid solutions to a specified context. However, one set might yield a better set of metrics relative to the other. Step 565 includes deriving the improved metrics through running a simulation of the construction project model utilizing the alternative set. The simulation can be localized to a specific design tool or the specified context, or can be a complete simulation of a plant life cycle depending on the metric. For example, if the metric is strictly cost, the simulations might include configuring a computer to analyze costs by incorporating parameters from the set of instantiated construction object. A more extensive example includes metric representing inspection efficiency over the life time of the plant. The inspection efficiency can be measured by running a Monte Carlo simulation of the plant over many life-times using historical plant operating parameters as a foundation for the simulation. The Monte Carlo can simulate having modeled inspectors work through inspections over the entire plant lifetime. Metrics associated with the inspections (e.g., successes, failures, speed, time, costs, etc.) can be statistically aggregated from the Monte Carlo simulations into a global context metric.

In some embodiments, step 570 comprises exporting the alternative set of construction objects to the one or more design tools. If the set is found to be advantageous, then the inference engine can configure the design tools to incorporate the construction object into their respective models of the plant construction.

Although a preferred embodiment is directed to a plant construction knowledge system, one should appreciate that the disclosed techniques can also be applied to other applications. One possible use could include presenting a predefined plot plan, which can be instantiated in engineering tools for further customizing or for high-level up front "walkthroughs" during a proposal phase of a project. In addition, at the back-end of a design project interfaces can be provided to operations or maintenance to provide syncing capabilities between tag- and asset-data during small modifications. It is also contemplated that the system can provide an interface for compiling training materials aggregated from the various tools or from rules within the assemblies. In some embodiments, an assembly could represent a form of training material (e.g., manual, presentation, schedule, etc.).

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A plant development knowledge system comprising:
   an assembly database storing a plurality of assembly objects, each of the assembly objects representative of a plant construction component and having an available context; and
   an inference engine coupled with the assembly database and comprising a modifiable inference module having inference rules, and configured to:
   infer a specified context from attributes of a construction project, wherein the specified context defines one or more design elements within one or more external tools;
   select an assembly object from the plurality of assembly objects that is related to the construction project according to the inference rules, the specified context, and the available context;
   instantiate a construction object that is representative of a physical construction object from the assembly object by deriving at least one physical attribute of the instantiated construction object based on at least one of the inference rule the specified context and the available context, wherein the least one physical attribute of the instantiated construction object corresponds to at least one physical dimension of the physical construction object; and
   configure an external tool to incorporate the instantiated construction object into a construction project model related to the specified context.

2. The system of claim 1, wherein the modifiable inference module comprises a forward chaining rule set.

3. The system of claim 2, wherein the attributes of the construction project comprise an initial condition definition.

4. The system of claim 1, wherein the modifiable inference module comprises a backward chaining rules set.

5. The system of claim 4, wherein the attributes of the construction project comprise an end condition definition.

6. The system of claim 1, wherein the modifiable inference module comprises a case-based-reasoning rules set.

7. The system of claim 6, wherein the attributes of the construction project comprise an initial condition and a final condition.

8. The system of claim 1, wherein the modifiable inference module comprises a compliance rule set.

9. The system of claim 1, wherein the inference engine is further configured to select the inference rules based on the specified context.

10. The system of claim 1, wherein the attributes of the construction project comprise a specified ontology.

11. The system of claim 10, wherein the instantiated construction object is bound to a second instantiated construction object according to the specified ontology.

12. The system of claim 10, wherein the available context is selected from a plurality of possible contexts of the assembly object according to the specified ontology.

13. The system of claim 1, wherein the at least one physical attribute is derived based on behavior rules of the assembly object, the specified context, and the inference rules.

14. The system of claim 13, wherein the inference engine is configured to select the behavior rules as a function of at least one of the following: the available context and a specified taxonomy.

15. The system of claim 1, wherein the assembly object is stored according to a tool-agnostic neutral format.

16. The system of claim 15, further comprising an assembly translator configured to convert the instantiated construction object from a common intermediary format to a tool format accepted by the external tool.

17. The system of claim 1, wherein the assembly object comprises an assembly of other assembly objects.

18. The system of claim 17, wherein the instantiated construction object comprises an assembly of other instantiated construction objects.

19. The system of claim 1, wherein the inference engine is further configured to infer an additional attribute of the construction project from at least one of the attributes of the plant construction component.

20. The system of claim 10, wherein the specified ontology is selected from a plurality of ontologies linked to the assembly object.

* * * * *